US012623517B1

(12) United States Patent
Carson

(10) Patent No.: US 12,623,517 B1
(45) Date of Patent: May 12, 2026

(54) AUXILIARY SUN SHIELD FOR VEHICLES

(71) Applicant: Greg Carson, Taylor, MI (US)

(72) Inventor: Greg Carson, Taylor, MI (US)

( * ) Notice: Subject to any disclaimer, the term of this patent is extended or adjusted under 35 U.S.C. 154(b) by 0 days.

(21) Appl. No.: 19/187,079

(22) Filed: Apr. 23, 2025

(51) Int. Cl.
　　 *B60J 3/02* 　　　　(2006.01)
(52) U.S. Cl.
　　 CPC ........... *B60J 3/0247* (2013.01); *B60J 3/0221* (2013.01); *B60J 3/0252* (2013.01)
(58) Field of Classification Search
　　 CPC ....... B60J 3/0247; B60J 3/0221; B60J 3/0252
　　 See application file for complete search history.

(56) References Cited

U.S. PATENT DOCUMENTS

| | | | |
|---|---|---|---|
| 3,940,180 A * | 2/1976 | Altschul | ..................... B60J 3/02 296/97.7 |
| 4,272,938 A | 6/1981 | Seipos | |
| D308,355 S | 6/1990 | Spoto | |
| 5,271,653 A * | 12/1993 | Shirley | .................. B60J 3/0208 296/97.8 |
| 5,564,771 A | 10/1996 | Chesters | |
| 5,641,191 A | 6/1997 | Jia | |

| | | | |
|---|---|---|---|
| 2002/0171256 A1 * | 11/2002 | Ward | ..................... B60R 1/083 296/97.7 |
| 2004/0217621 A1 | 11/2004 | McCoy | |
| 2005/0017534 A1 | 1/2005 | Driscoll | |
| 2011/0156435 A1 | 6/2011 | Carter | |
| 2015/0047798 A1 | 2/2015 | Guina | |
| 2019/0337362 A1 * | 11/2019 | Shea | ..................... B60J 3/0208 |
| 2022/0355217 A1 * | 11/2022 | Hamilton | ................. A63H 3/50 |

* cited by examiner

*Primary Examiner* — Lori Lyjak
(74) *Attorney, Agent, or Firm* — Gugliotta & Gugliotta LPA

(57) ABSTRACT

An auxiliary sun shield for vehicles includes a shield, an adjustable pole having a flexible pole body, a swivel connection between the shield and the adjustable pole, and a fastening means configured to removably attach to an interior surface of a vehicle. The shield is generally a planar disk-shaped device approximately three inches in diameter. The flexible pole body can be bent, crimped, straightened, or curved to achieve optimal positioning. The fastening means may include a clip for attachment to a sun visor edge, hook-and-loop fasteners for attachment to various interior surfaces, or a suction cup for attachment to a windshield. The swivel connection allows independent pivoting movements between the shield and the adjustable pole. The auxiliary sun shield provides supplementary sun protection to block glare not adequately covered by conventional factory-installed sun visors, thereby enhancing driver visibility and safety.

19 Claims, 5 Drawing Sheets

10

AUXILIARY SUN SHIELD FOR VEHICLES

CROSS-REFERENCE TO RELATED APPLICATIONS

There are no previously filed, nor currently any co-pending applications, anywhere in the world. Additional applications of related continuity are further disclosed as part of the Application Data Sheet filed pursuant to 37 C.F.R. § 1.76. All Related Applications are incorporated by reference as if fully rewritten herein.

BACKGROUND OF THE INVENTION

1. Field of the Invention

The present invention relates generally to an auxiliary sun shield that can be attached to a vehicle's interior surfaces to supplement conventional sun visors by blocking glare from angles not covered by factory-installed equipment, thereby improving driver visibility and safety.

2. Description of the Related Art

Virtually all modern motor vehicles are equipped with sun visors as standard equipment to shield drivers from direct sunlight and reduce glare. These original equipment manufacturer (O E M) visors typically consist of rectangular panels hinged to the vehicle ceiling, allowing them to be positioned against the windshield or rotated to cover a portion of the side windows. However, these conventional sun visors present significant limitations in their functionality and coverage area.

Standard OEM visors are designed with fixed dimensions that cannot accommodate the full range of sun angles encountered during normal driving conditions. When the sun is positioned at lower angles or from directions not directly aligned with the visor's coverage area, drivers experience significant glare that can impair visibility. This is particularly problematic during sunrise and sunset periods or when traveling on curved roads where the sun's position relative to the vehicle changes rapidly.

Additionally, conventional visors offer limited coverage for side windows and cannot address sunlight entering from angles between the windshield and side windows. As a result, drivers often resort to makeshift solutions such as wearing sunglasses (which may reduce overall visibility) or attaching aftermarket tinted films to windows (which permanently reduce light transmission).

This visibility impairment caused by inadequate sun protection represents a considerable safety hazard. Drivers experiencing sun glare have significantly reduced reaction times and diminished ability to detect road hazards, potentially leading to accidents. The National Highway Traffic Safety Administration has identified sun glare as a contributing factor in thousands of accidents annually.

Furthermore, extended exposure to intense sunlight entering vehicle cabins can cause interior components to deteriorate prematurely and may contribute to elevated cabin temperatures, increasing the demand on climate control systems and reducing fuel efficiency.

The automotive aftermarket has attempted to address these issues with various solutions, including visor extenders and clip-on panels, but these products typically lack the versatility needed to block sunlight from multiple angles or require permanent installation. There exists a clear need for a supplementary sun-blocking device that offers flexible positioning, universal compatibility with different vehicle interiors, and ease of adjustment while driving.

SUMMARY OF THE INVENTION

It is thus an object of the present invention to provide an auxiliary sun shield that effectively blocks sunlight from angles not covered by factory-installed sun visors.

It is a further object of the present invention to provide an auxiliary sun shield with a highly adjustable mechanism that allows precise positioning to block glare regardless of sun angle or direction.

It is still a further object of the present invention to provide an auxiliary sun shield with multiple attachment options to accommodate various vehicle interior surfaces.

The present invention provides an auxiliary sun shield particularly suited for acting as an auxiliary shielding means for shielding bright glare from entering a cabin of a vehicle. This is particularly helpful for the occupants within the cabin to operate the vehicle safely, and also to protect the features within the cabin from overheating or damage due to elevated thermal and/or ultraviolet radiation. In preferred embodiments, the inventive apparatus includes: a shield; an adjustable pole having a flexible pole body with a first end and a second end; a swivel connection between the shield and the adjustable pole; and a fastening means configured to removably attach to a desired interior surface of the vehicle. The fastening means may include a clip for attachment to a sun visor edge, hook-and-loop fasteners for attachment to various interior surfaces, or a suction cup for attachment to a windshield. The flexible pole body can be bent, crimped, straightened, or curved to achieve optimal positioning of the shield relative to the direction of sunlight glare.

It is an advantage of the present invention to provide an auxiliary sun shield that effectively blocks sunlight from angles not covered by factory-installed sun visors.

It is another advantage of the present invention to offer a highly adjustable mechanism that allows precise positioning of the sun shield to block glare regardless of sun angle or direction.

It is an advantage of the present invention to incorporate multiple attachment options, including spring clips, hook-and-loop fasteners, and suction cups, providing versatile mounting capabilities for various vehicle interiors.

It is another advantage of the present invention to feature a swivel connection between the shield and adjustable pole, enabling three-dimensional positioning adjustments to maximize sun-blocking effectiveness.

It is an advantage of the present invention to utilize a compact, three-inch diameter shield that provides targeted sun blocking without obstructing the overall field of vision required for safe driving.

It is another advantage of the present invention to employ lightweight, cost-effective materials that make the auxiliary sun shield both economical to manufacture and convenient for drivers to manipulate while operating their vehicles.

It is an advantage of the present invention to create a supplementary sun protection system that can be rapidly deployed or repositioned as driving conditions and sun position change.

It is another advantage of the present invention to offer a solution that requires no permanent modifications to the vehicle, allowing for easy installation and removal when not needed.

It is an advantage of the present invention to enhance driver safety by reducing dangerous sun glare that can temporarily blind drivers and contribute to accidents.

It is another advantage of the present invention to protect vehicle interiors from sun damage and excessive heat buildup by blocking direct sunlight from entering the cabin.

Further features of the invention will become apparent in the course of the following description.

BRIEF DESCRIPTION OF DRAWINGS

The advantages and features of the present invention will become better understood with reference to the following more detailed description and claims taken in conjunction with the accompanying drawings, in which like elements are identified with like symbols, and in which:

DETAILED DESCRIPTION OF THE INVENTION

Figure 1:
FIG. 1 is a first side perspective view of an auxiliary sun shield 10, in accordance with a preferred embodiment of the present invention.
Figure 1:
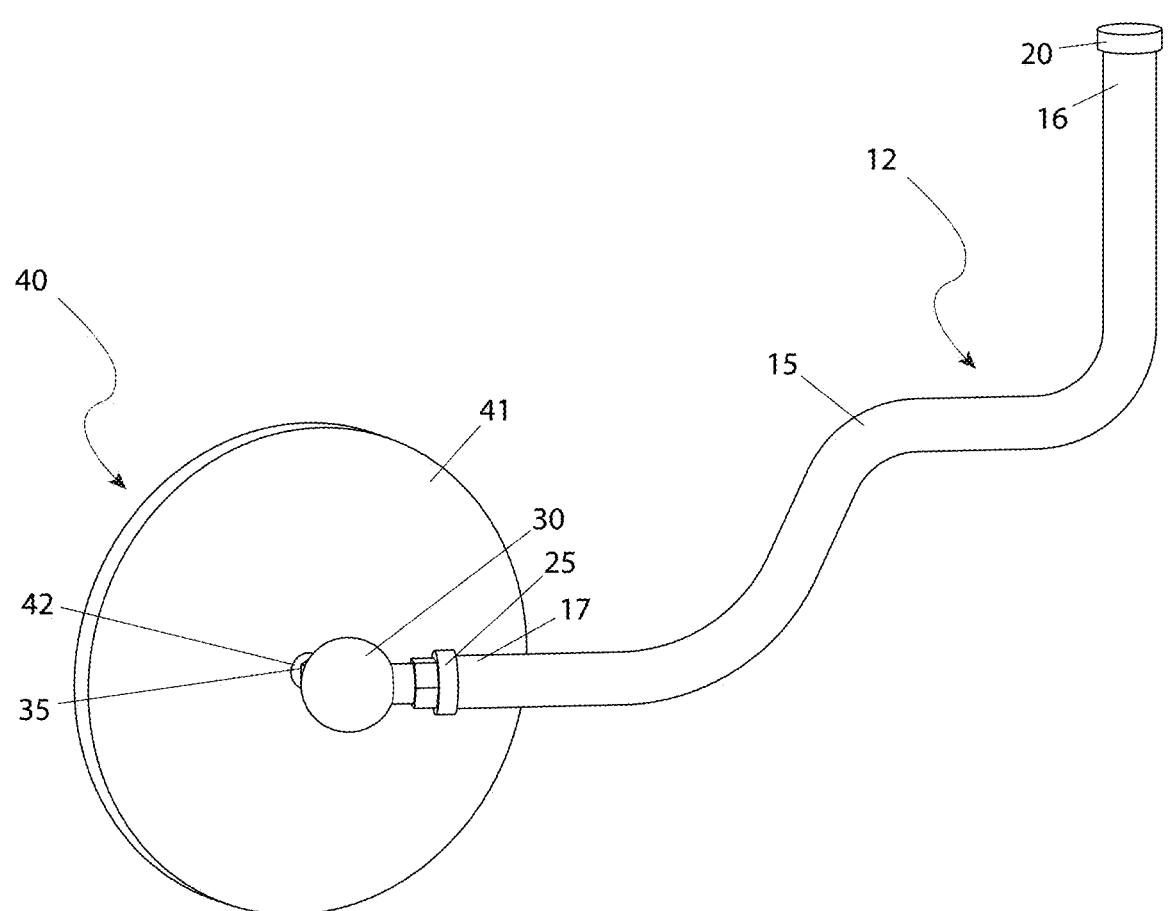

The best mode for carrying out the invention is presented in terms of its preferred embodiment, herein depicted within the Figures. It should be understood that the legal scope of the description is defined by the words of the claims set forth at the end of this patent and that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The best mode for carrying out the invention is presented in terms of its preferred embodiment, herein depicted within the Figures.

1. Detailed Description of the Figures

Before explaining the present invention in detail, it is important to understand that the invention is not limited in its application to the details of the construction illustrated and the steps described herein. The invention is capable of other embodiments and of being practiced or carried out in a variety of ways. It is to be understood that the phraseology and terminology employed herein is for the purpose of description and not of limitation.

Referring now to the drawings, wherein like reference numerals indicate the same parts throughout the several views, an auxiliary sun shade, generally noted as 10, is provided according to the preferred embodiment of the present invention particularly suited for acting as an auxiliary shielding means for shielding bright glare from entering a cabin of a vehicle 50. This is particularly helpful for the occupants within the cabin to operate the vehicle 50 safely, and also to protect the features within the cabin from overheating or damage due to elevated thermal and/or ultraviolet radiation. The auxiliary sun shade 10 can be used concurrently or independently of conventional sun visors 60 within the vehicle 50. The auxiliary sun shade 10 has a fastening means configured to removably attach to a desired interior surface of the vehicle 50. Such a desired interior location may be adjacent to the operator of the vehicle 50 such that manipulation of the auxiliary sun shade 10 is within reach of the operator.

Figures 2, 3:
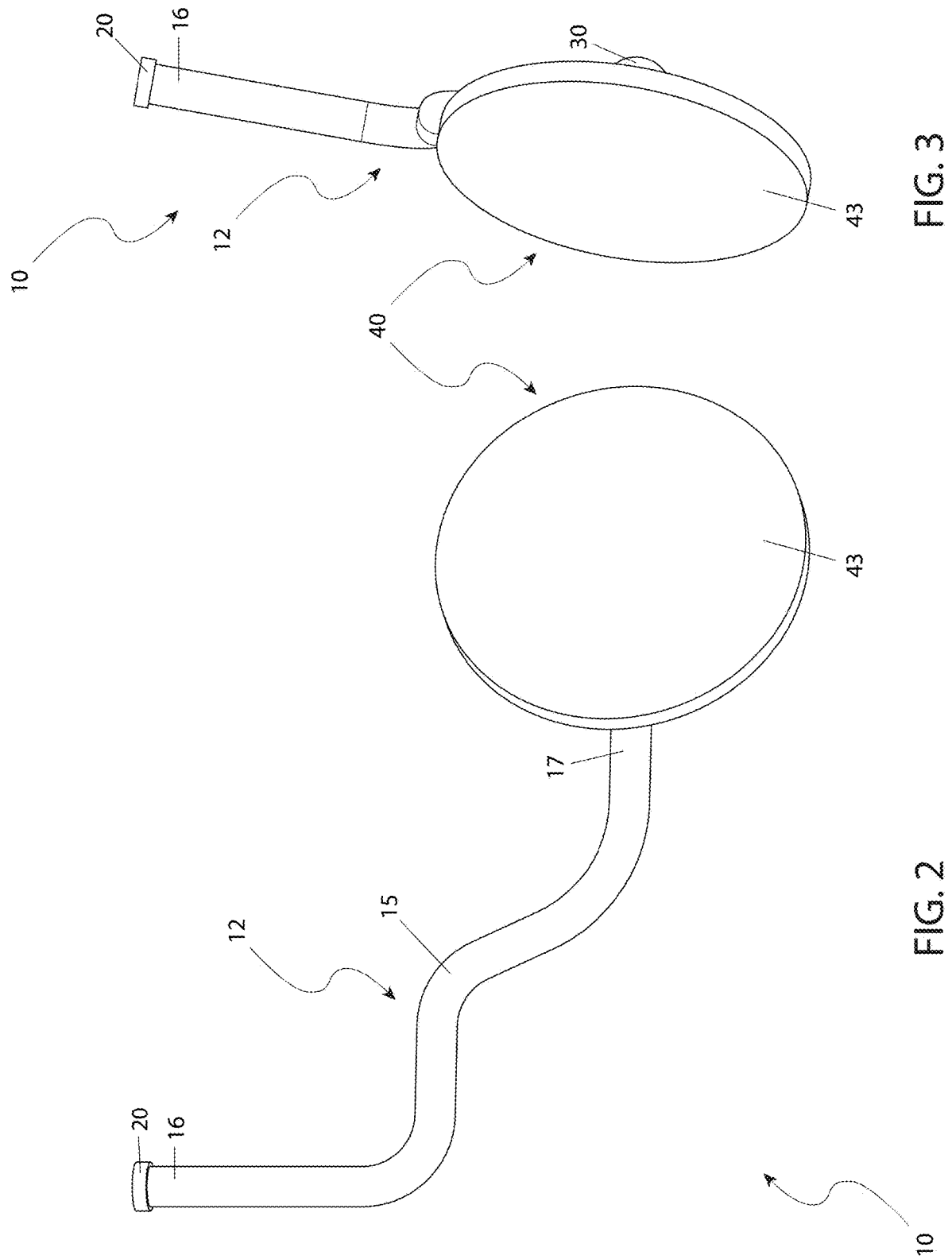
FIG. 2 is a second side perspective view of the auxiliary sun shield 10, in accordance with a preferred embodiment of the present invention.
FIG. 3 is a top plan view of the auxiliary sun shield 10, in accordance with a preferred embodiment of the present invention.

In reference to FIGS. 1-3, it can be seen in various views that auxiliary sun shade 10 includes a shield 40 that is selectively adjustably movable relative to an adjustable pole 12. This is accomplished with a swivel 30. The adjustable pole 12 has a generally cylindrical pole body 15 having a pole first end 16 and a pole second end 17. The pole body 15 is flexible and capable of being adjustable across an entire length thereof and may be solid or hollow. In some embodiments, the pole body 15 is a capable or other similar device that is capable of retaining a manipulated configuration without the effects of gravity interference. The pole body 15 can be bent, crimped, straightened, curved, etc. Attached to a terminal end of the pole first end 16 is an end cap 20. The end cap 20 has a larger diameter or width than the diameter or width of the pole body 15 such that the end cap 20 may provide a stop to full removal of the pole body 15 from any fastening means attached thereto. Attached or otherwise affixed to the pole second end 17 is a swivel pole end 25. The swivel pole end 25 is pivotally attached to the swivel 30.

The shield 40 is generally a planar disk-shaped device having a shield first side 41 and a shield second side 43. It is appreciated that the shield first side 41 had a shield connector 42 located at a center thereof and extending outward therefrom. Attached or otherwise affixed to the distal extended end of the shield connector 42 is a swivel shield end 35. The swivel shield end 35 is pivotally attached to the swivel 30. The swivel 30 allows independent pivoting movements between the shield 40 and the adjustable pole 20. The shield second side 43 is preferably planar but may further comprise indicia printed or formed thereto, thereof, or thereon, or coatings, impregnations, absorptions, or attachments to enhance the auxiliary shielding means. The shield 40 may have an overall diameter of three inches (3 in.).

Figure 4A:
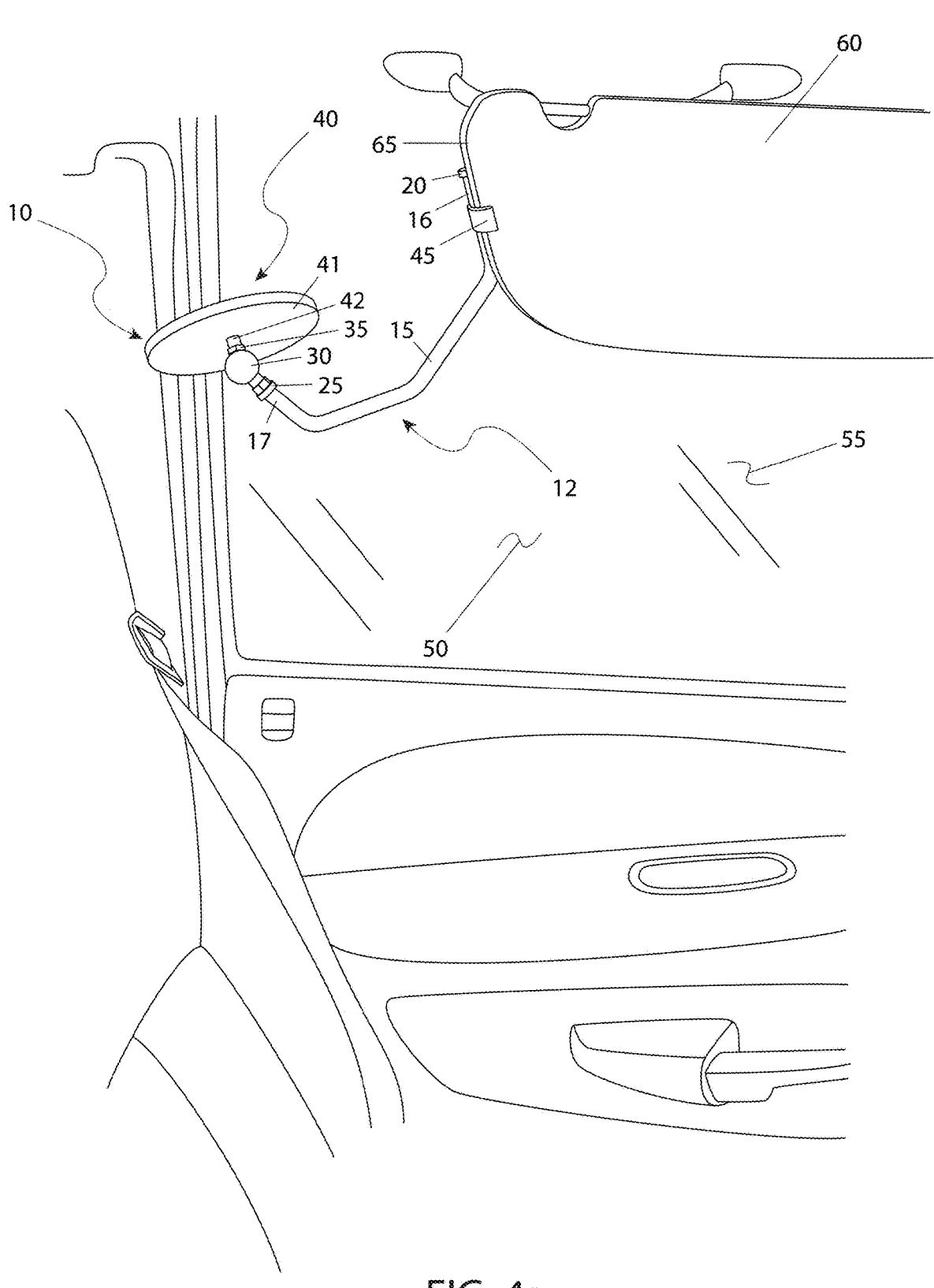
FIG. 4a is an environmental view of the auxiliary sun shield 10 removably affixed to a sun visor 60 of a vehicle 50, in accordance with a first method of use of the present invention.
Figure 4B:
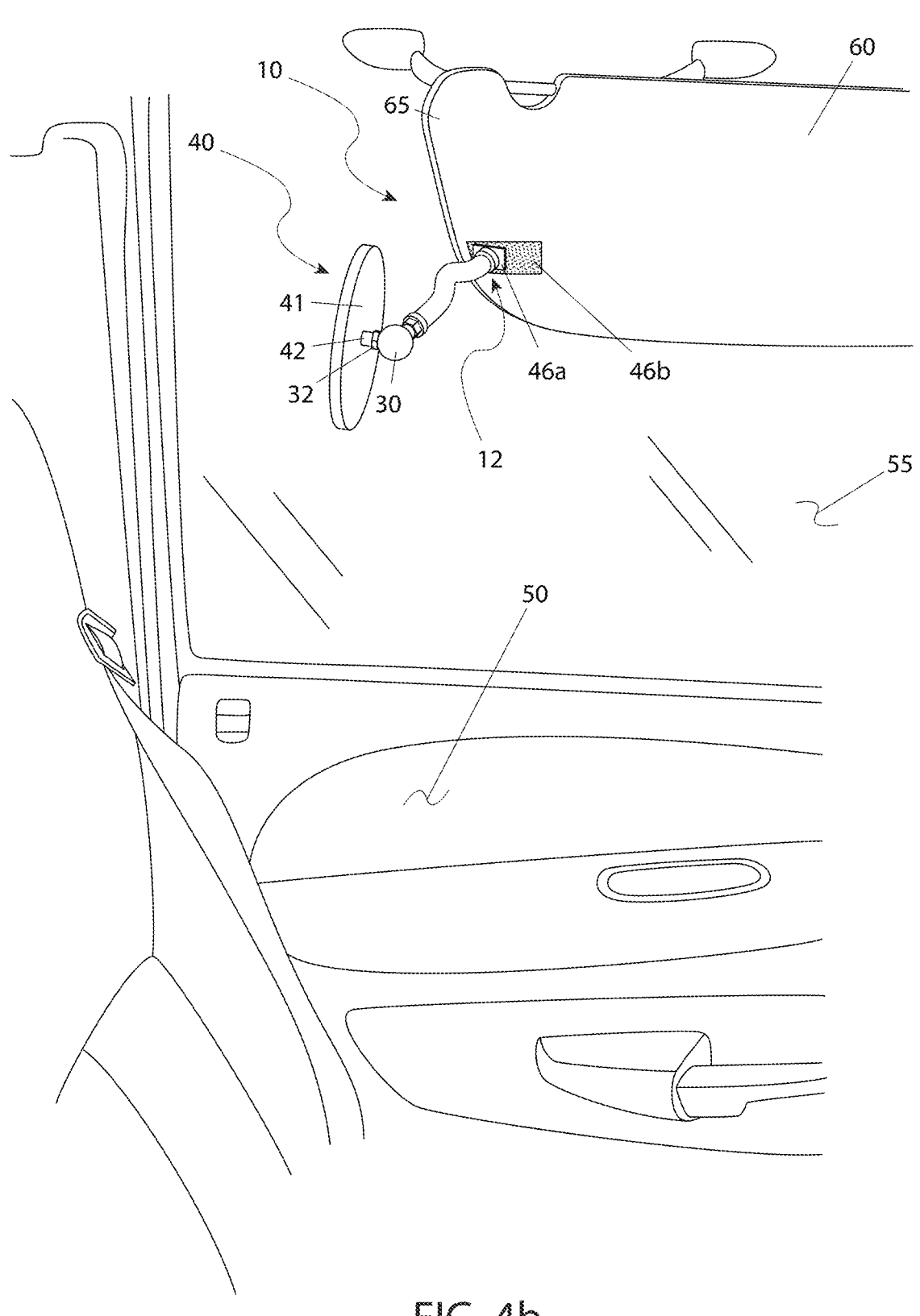
FIG. 4b is an environmental view of the auxiliary sun shield 10 removably affixed to the sun visor 60 of a vehicle 50, in accordance with a second method of use of the present invention; and, FIG. 4c is an environmental view of the auxiliary sun shield 10 removably affixed to a windshield 56 of a vehicle 50, in accordance with a third method of use of the present invention.
Figure 4C:
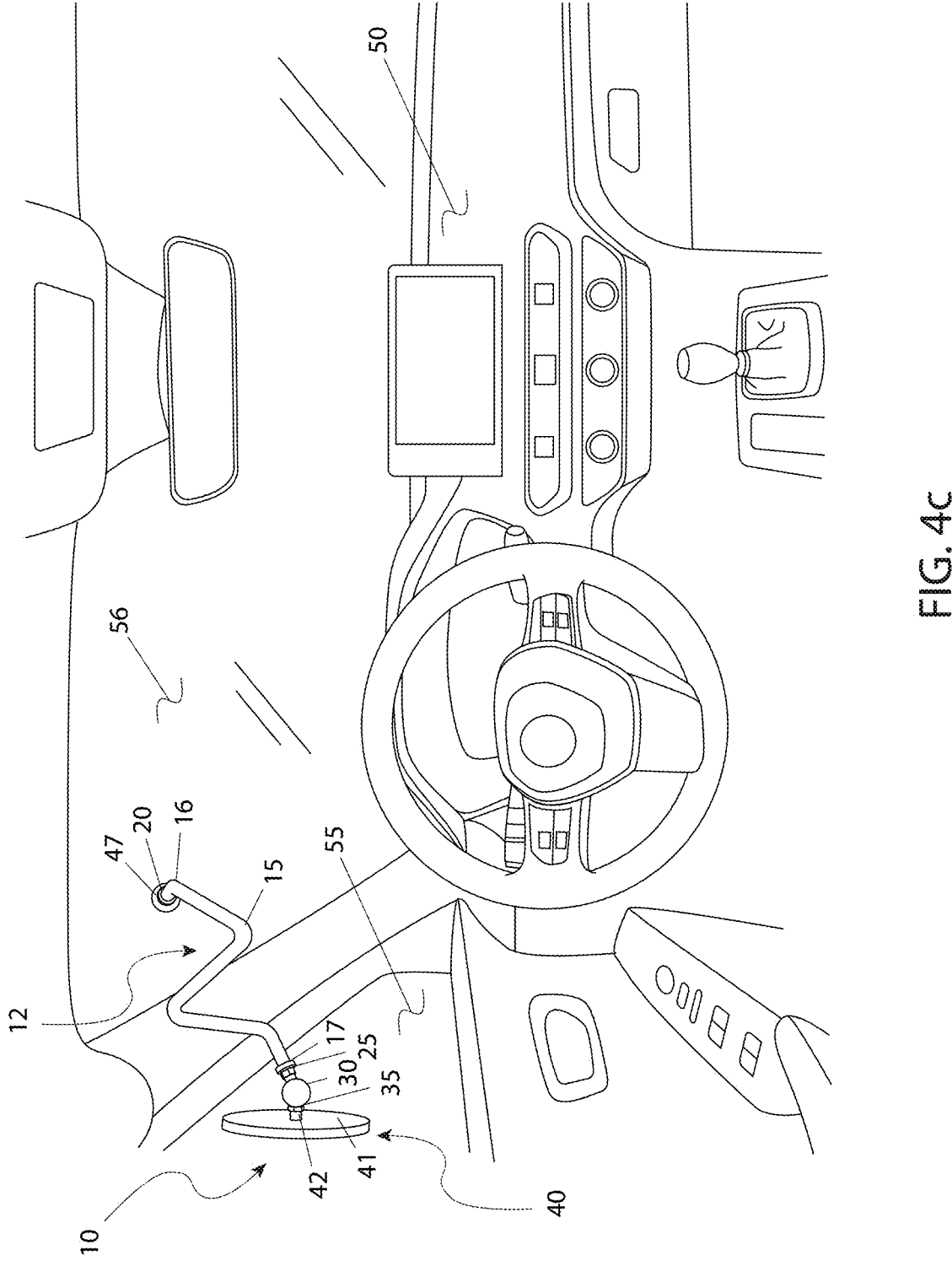

FIGS. 4a-4c, illustrated in various environmental views, it can be seen that the fastening means that removably fastens the auxiliary sun shade 10 to an interior surface of the vehicle 10 can be provided in different examples. Referring now more closely to FIG. 4a, an exemplary method of use of the auxiliary sun shade 10, it can be seen where the auxiliary shielding means is needed due to the existing sun visor 60 not capable of fully covering the side window 55 through which the direction of glare is concentrated. The fastening means can include a clip 45 having a first end that is fixedly, removably, or adjustably attached or to the pole body 15, and a second end that can removably attach to a sun visor edge 65 of the sun visor 60. The second of the clip may be a clamping mechanism, a friction fit connection, or any other secure yet removable way to couple the auxiliary sun shade 10 to the sun visor edge 65.

Referring now more closely to FIG. 4b, another exemplary method of use of the auxiliary sun shade 10, it can be seen where the auxiliary shielding means is needed due to the existing sun visor 60 not capable of fully covering the side window 55 through which the direction of glare is concentrated. The fastening means can include a first fastener strip 46a attached or otherwise affixed to a surface of the end cap 20. The first fastening strip 46a is capable of correspondingly mating with a second fastener strip 46b. The second fastener strip 46b is configured to be removably attached to a desired position on the interior surface of the vehicle 50 or sun visor 60. The first fastener strip 46a and second fastener strip 46b may be complementary halves of a hook-and-loop-type of fastener, such as Velcro®.

Referring now more closely to FIG. 4c, yet another exemplary method of use of the auxiliary sun shade 10, it can be seen where the auxiliary shielding means is needed due to the existing sun visor 60 not capable of fully covering the windshield 56 through which the direction of glare is concentrated. The fastening means can include a suction cup 47 having a first end that is attached or otherwise affixed to the end cap 20, and a second end that can removably attach to the windshield 56 with a suctioning force.

In certain embodiments, the shield 40, swivel 30, and adjustable pole 20 may be of a similar or identical material of construction and aesthetics. The adjustable pole 12 may be and the shield 40 may be paper stock or plastic, materials that are lightweight and cost effective. The auxiliary sun shade 10 should be durable and resilient and capable of moderately rugged use. Due to the capability of the adjustable pole 12 to be movable about its entire length, the adjustable and secure removable attachment of the fastening means, the ability of the pole body 15 to slide longitudinally within and the ability of the shield 40 to be pivotably adjustable about the swivel 30 relative to the adjustable pole 12, the auxiliary shielding means is highly customizable. As aforementioned and seen in FIGS. 4a-4c, the fastening means can be defined as securing the auxiliary sun shade 10 by securely retention of the pole body 15 in the clip 45 (if present) until stopped by the end cap 20, securing a first fastener strip 46a (if present) on the end cap 20 of the adjustable pole 12 to a second fastener strip 46b (if present) and placement of the second fastener strip 46b to a desired location on a sun visor 60, or securing a suction cup 47 (if present) on the end cap 20 of the adjustable pole 12 to a desired interior surface of the vehicle 50.

2. Operation of the Preferred Embodiment

In operation, the present invention provides a highly customizable auxiliary sun shield for vehicles. To use the auxiliary sun shade 10, the user first determines the direction of sun glare that needs to be blocked. The user then selects the appropriate fastening means based on the desired mounting location:

If attaching to the edge of an existing sun visor 60, the user employs the clip 45 to secure the auxiliary sun shade 10 to the sun visor edge 65, as shown in FIG. 4a.

If attaching to a flat surface such as the sun visor 60 or another interior surface, the user may employ the hook-and-loop fastener system (46a, 46b) as shown in FIG. 4b.

If attaching directly to the windshield 56 or a side window 55, the user may employ the suction cup 47 as shown in FIG. 4c.

Once the auxiliary sun shade 10 is securely attached at the desired location, the user adjusts the flexible pole body 15 by bending, crimping, or otherwise manipulating it to position the shield 40 in the optimal location to block the sun's glare. The swivel 30 allows the shield 40 to be pivoted independently of the adjustable pole 12, providing an additional degree of adjustment to precisely align the shield 40 with the direction of the sun's rays.

The shield 40, with its approximately three-inch diameter, provides sufficient coverage to block sun glare while minimizing obstruction of the driver's overall field of vision. As the sun's position changes during driving, the user can easily readjust the position of the shield 40 by further manipulating the flexible pole body 15 or adjusting the angle of the shield 40 through the swivel 30.

When no longer needed, the auxiliary sun shade 10 can be easily removed from its mounting location and stored until the next use. The compact size and lightweight construction make it convenient to keep within the vehicle for ready access.

The foregoing descriptions of specific embodiments of the present invention are presented for purposes of illustration and description. The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein but is to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed. They are not intended to be exhaustive nor to limit the invention to precise forms disclosed and, obviously, many modifications and variations are possible in light of the above teaching. The embodiments are chosen and described in order to best explain principles of the invention and its practical application, to thereby enable others skilled in the art to best utilize the invention and its various embodiments with various modifications as are suited to the particular use contemplated. It is intended that a scope of the invention be defined broadly by the Drawings and Specification appended hereto and to their equivalents. Therefore, the scope of the invention is in no way to be limited only by any adverse inference under the rulings of Warner-Jenkinson Company, v. Hilton Davis Chemical, 520 US 17 (1997) or Festo Corp. v. Shoketsu Kinzoku Kogyo Kabushiki Co., 535 U.S. 722 (2002), or other similar caselaw or subsequent precedent should not be made if any future claims are added or amended subsequent to this Patent Application.

The invention claimed is:

1. An auxiliary sun shield for a vehicle comprising:
a circular shield;
an adjustable pole having a flexible pole body with a first end and a second end, wherein the flexible pole body can be manipulated to achieve and maintain various configurations;
a swivel connection between the circular shield and the adjustable pole allowing three-dimensional positioning of the circular shield; and
a fastening means configured to removably attach to an interior surface of the vehicl;
wherein the flexible pole body provides gross positioning adjustment through bending and the swivel connection provides fine rotational adjustment of the circular shield.

2. The auxiliary sun shield of claim 1, wherein the circular shield is a planar disk-shaped device having a diameter of approximately three inches and provided targeted sun blocking while minimizing obstruction of a driver's field of vision.

3. The auxiliary sun shield of claim 1, wherein the flexible pole body is capable of being bent, crimped, straightened, or curved to retain a desired configuration without the effects of gravity interference.

4. The auxiliary sun shield of claim 1, wherein the fastening means comprises a spring-loaded clip configured to removably attach to an edge of a vehicle sun visor.

5. The auxiliary sun shield of claim 1, wherein the fastening means comprises:
a first fastener strip attached to the first end of the adjustable pole, and
a second fastener strip configured to be removably attached to a desired position on the interior surface of the vehicle,
wherein the first fastener strip and second fastener strip are complementary halves of a hook-and-loop-type fastener.

6. The auxiliary sun shield of claim 1, wherein the fastening means comprises a suction cup configured to removably attach to a windshield or window of the vehicle.

7. The auxiliary sun shield of claim 1, wherein the swivel connection allows independent pivoting movements between the circular shield and the adjustable pole to precisely align the circular shield with a direction of sun glare.

8. The auxiliary sun shield of claim 1, wherein the circular shield comprises:
a shield connector extending from a first side of the circular shield; and
wherein the swivel connection comprises a swivel shield end attached to the shield connector and a swivel pole end attached to the second end of the flexible pole body.

9. The auxiliary sun shield of claim 1, further comprising an end cap attached to the first end of the flexible pole body, wherein:

the end cap has a larger diameter than the flexible pole body;
the end cap provides a physical stop to prevent complete removal of the flexible pole body from the fastening means during adjustment of the sun shield position while blocking sun glare in a vehicle; and
the fastening means is attached to the end cap and configured to removably attach to an interior surface of the vehicle.

10. The auxiliary sun shield of claim 9, wherein the fastening means is selected from the group consisting of: a spring clip configured to attach to a vehicle sun visor edge, a hook-and-loop fastener configured to attach to a vehicle sun visor surface, and a suction cup configured to attach to a vehicle windshield or window, wherein each fastening means releasably secures the end cap while allowing sliding adjustment of the flexible pole body through the fastening means to permit repositioning of the circular shield relative to incoming sun glare while preventing inadvertent detachment during vehicle operation.

11. An auxiliary sun shield system for supplementing a factory-installed sun visor in a vehicle, the system comprising:
a circular sun-blocking shield constructed from a lightweight material;
a flexible, positionable arm having a first end and a second end, wherein the flexible arm maintains a set position after being adjusted;
a swivel joint connecting the second end of the flexible arm to the circular sun-blocking shield; and
an attachment mechanism connected to the first end of the flexible arm, the attachment mechanism configured to removably secure the auxiliary sun shield system to a vehicle interior surface;
wherein the circular sun-blocking shield is positionable to block sun glare in areas not covered by the factory-installed sun visor.

12. The auxiliary sun shield system of claim 11, wherein the attachment mechanism is selected from the group consisting of:
a spring clip configured to attach to an edge of the factory-installed sun visor;
a hook-and-loop fastener configured to attach to a surface of the factory-installed sun visor; and
a suction cup configured to attach directly to a vehicle window.

13. The auxiliary sun shield system of claim 11, wherein the circular sun-blocking shield has a diameter of approximately three inches to provide targeted sun blocking while minimizing obstruction of a driver's field of vision.

14. The auxiliary sun shield system of claim 11, wherein the flexible arm comprises a malleable core that enables the arm to be formed into various shapes and maintain those shapes during use.

15. A method of blocking sunlight in a vehicle, comprising:
providing an auxiliary sun shield having a circular shield element, a flexible arm, a swivel joint connecting the circular shield element to the flexible arm, and an attachment mechanism;
securing the attachment mechanism to a surface within the vehicle interior;
manipulating the flexible arm to position the circular shield element in alignment with an incoming sunlight angle not blocked by a factory-installed sun visor; and
adjusting the circular shield element via the swivel joint to optimize sun-blocking coverage.

16. The method of claim 15, wherein securing the attachment mechanism comprises attaching a spring clip to an edge of the factory-installed sun visor.

17. The method of claim 15, wherein securing the attachment mechanism comprises adhering a hook-and-loop fastener to a surface of the factory-installed sun visor.

18. The method of claim 15, wherein securing the attachment mechanism comprises attaching a suction cup to a windshield or window of the vehicle.

19. The method of claim 15, further comprising repositioning the circular shield element as the angle of incoming sunlight changes during vehicle operation.

* * * * *